United States Patent Office 3,120,448
Patented Feb. 4, 1964

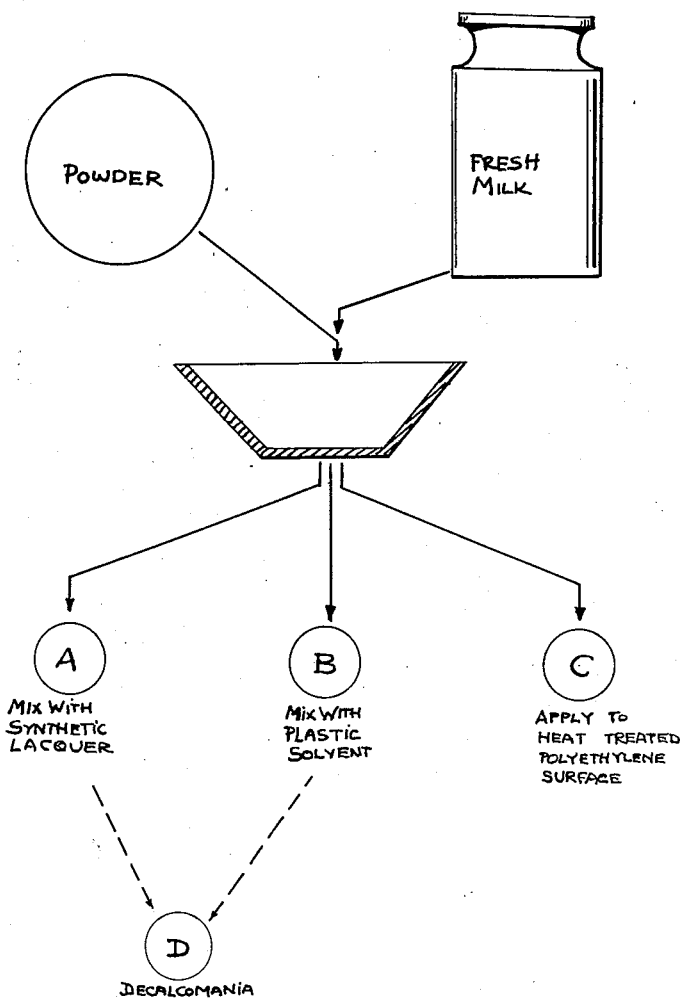

3,120,448
LUMINOUS COATING METHOD, COMPOSITION AND DECALCOMANIA
Reidar Paulsen, Asker, Norway; Signy Damsgaard Paulsen, heir of the estate of said Reidar Paulsen, deceased
Filed Mar. 18, 1960, Ser. No. 16,065
10 Claims. (Cl. 117—33.5)

The invention relates to luminous coating, and relates more particularly to luminous coating which comprises a luminous substance and becomes luminous after exposure to light at least of the visible spectrum, and is free from radioactive material. Still more particularly, the invention relates to the preparation of such a coating, to its composition and to the production of decalcomania pictures that may be transferred to a base plate.

This is a continuation-in-part of my application Serial No. 828,456, filed in the United States Patent Office on July 21, 1959, now abandoned, under claim of priority of a corresponding application filed in the Kingdom of Norway on October 27, 1958 (No. 129,673, 1958).

Luminous substances and coatings are available today, and may broadly be classified in two classes, namely radioactive coatings, such as often are used on watch dials, and cellulose substances. Luminous coatings made of radioactive substances are by many considered hazardous or even dangerous to health, as possibly apt to produce cancerous growth upon prolonged contact with human skin.

Luminous materials based on cellulose luminous substances, while free from cancerogen material, have been found defective in that they chip and break and do not retain the luminosity beyond comparably short periods of time.

It is accordingly among the principal objects of the invention to provide a luminous coating which is free from any radioactive substance and which after but brief exposure, for instance of 15 seconds, will produce luminosity that may last for several hours at considerable brightness.

It is another object of the invention to provide such a coating which will not chip or break, but admits of bending with any flexible base, and which is easy to prepare and simple to use, and durable in its application.

It is still another object of the instant invention to provide a coating of this type which will be luminous in various colors, such as yellow or green or orange, or orange-red, or red or blue or white.

It is yet another object of the instant invention to provide a coating that may be applied to the surface of a material free from any synthetic resin (hereinafter referred to as "non-plastic material"), such as wood or metal or paper or glass, as well as a coating that may be applied to a surface of a material of synthetic resin such as vinyl or cellulose resin, nylon, or the like, and a coating that may be applied to polyethylene, and a coating transferable in form of decalcomania pictures.

Further objects and advantages of the invention will be set forth in part in the following specification and in part will be obvious therefrom without being specifically referred to, the same being realized and attained as pointed out in the claims hereof.

The foregoing and other objects of the invention will be best understood from the following description of exemplifications thereof, reference being had to the accompanying drawing, wherein there is shown in a single view a flow diagram.

Broadly speaking, in carrying out the first phase of my invention, I mix a powdery substance of pigmented zinc sulfide and zinc cadmium sulfide with fresh milk until the powdery substance is emulsified in the fresh milk. The fresh milk is used preferably as it comes from the cow, sweet and without being dairy processed, preferably standing about one-half hour after milking at room temperature before being used in the process.

While I do not entirely understand the reasons for the effects of my invention, I believe that there is involved a biochemical process; I believe, for instance, that during the aforesaid standing period bacteria find their way into the milk and play subsequently a role not fully understood by me.

I have found that the best milk for the instant purpose is obtained from Jersey cows with highest fat content, and I have found it to be important that water fed to the cows be free from any chloride.

The milk is poured over the powder, and the whole is then stirred at room temperature, by hand or by machine, for about 30 to 45 minutes, until the milk is no longer visible and the emulsification complete. The appearance of the resultant mixture is granular and dry.

The amounts, by weight, mixed in accordance with the first phase of the invention above referred to, as well as the subsequent phase or phases depend on the nature of the surface to which the coating is ultimately to be applied. Broadly speaking, there are four different ultimate uses, which have been indicated at A, B, C and D in the accompanying drawing.

The first use, indicated at A in the drawing, is where the ultimate coating is applied to a surface of a "non-plastic" material, for instance wood, metal, paper, glass or the like. This is hereinafter referred to as "non-plastic" surface use.

A second use is that, indicated at B in the drawing, wherein the coating is applied to the surface of a material of synthetic resin other than polyethylene, such as vinyl resin, cellulose resin, nylon, resin known under the trademark "Lucite," or the like. This is hereinafter referred to as "synthetic resin" surface use.

A third application is that, indicated at C in the drawing, where the coating is ultimately applied to a surface of polyethylene. This is hereinafter termed "polyethylene" surface use.

Lastly, the instant invention may be incorporated in a decalcomania or transfer picture, indicated at D in the drawing, and hereinafter referred to as "decalcomania" use.

The foregoing classification is made only for the purpose of convenience of presentation, and is not intended to be exhaustive, as obviously other classifications can be made, and also as other uses for the instant invention may be found within the scope of the appended claims.

In the following, examples are given, separately for each of the aforesaid end uses.

The type of powdery substance that I have found best suitable for the instant purpose is a powdery substance which is composed of a mixture of pigmented zinc sulfide and zinc cadmium sulfide manufactured by Riedel-de Haën Aktiengesellschaft of Hannover, Germany, and in the examples listed below the particular powdery substance used is marketed by the aforesaid firm under the designation "Leuchtgelb Supra A" (luminous yellow). It will be understood, however, that the invention is not limited to this exact product, nor, of course, to the color yellow, as other luminous pigmented powdery substances may equally be applicable for the instant purposes and other colors are well suited.

(A) NON-PLASTIC SURFACE USE

*Example I*

About 1000 grams of the aforesaid powdery substance were mixed with about 400 (the value "R" equals 400) grams of fresh milk by pouring the milk over the powder, in a container, and stirred in the container at room temperature for about 30 minutes until the emulsification was complete. The resultant mixture was then mixed with about 600 grams of a clear synthetic lacquer. For this purpose I generally prefer a clear lacquer sold under the trademark "Steelcote," by the Steelcote Company of St. Louis, Mo. The lacquer consists of clear nitrocellulose, a neutral hard rosin based resin, and a neutral linseed oil in typical lacquer solvents, the latter essentially consisting of toluol, butanol, and methyl-isobutyl-ketone.

The lacquer was poured over the mixture and continuously stirred at room temperature for about 30 minutes.

The resultant coating mixture was then applied by silk screen application to a glass surface.

I have found that the 1000 grams of the powdery substance may be mixed with fresh milk for the instant example, not only with about 400 grams of fresh milk, but with fresh milk within the range of from about 350 to about 450 (the value "R" equals 350 to 450) grams.

I have furthermore found that the weight of the admixed clear lacquer may be within a range of from about 550 to 750 grams.

Example II

A mixture of powdery substance and fresh dairy milk, as per Example I, was mixed with about 1600 grams of clear lacquer. This resultant coating mixture is suitable for spray-on application onto glass, metal, or the like or for a rolling-on application onto such a surface.

I have found that for spray-on and rolling-on application the weight of the lacquer admixed may be within a range of from about 600 to 2000 grams.

The aforesaid synthetic lacquer may either be shiny or dull, and before it is admixed to the preceding powder-and-milk emulsion there may be added to the synthetic lacquer up to approximately 10% by weight of fresh milk.

(B) SYNTHETIC RESIN SURFACE USE

Example III

A powder-and-milk emulsion, per Example I, is mixed with about 600 grams of a solvent of the material of synthetic resin to which the coating will be applied. The solvent needs to be of the type that will have no adverse effect on the pigment or the milk or the bacterial process.

The resultant coating mixture is then applied to the surface of the material of synthetic resin.

I have found that the admixture of solvent may range from about 500 to 800 grams.

(C) POLYETHYLENE SURFACE USE

Example IV

About 1000 grams of the aforesaid powdery substance are mixed with about 100 (the value "R" equals 100) grams of fresh milk, and the resultant mixture applied directly to a polyethylene surface, the latter having been previously heat treated. The heat treating referred to may be carried out, by heating the surface of the polyethylene with a flame quite close so that the cone of the flame touches the surface. This heat treatment may be carried out in accordance with Patent No. 2,632,921 issued March 31, 1953 to Werner H. Kreidl. Thereafter, the aforesaid mixture is poured onto the surface, and then allowed to cool.

I have found that the admixture of fresh milk to the powdery substance is within the range of from about 80 to about 120 (the value "R" equals 80 to 120) grams. The mixture is stirred until the emulsification is complete and is granular and has a dry appearance.

It will be noted that for applying onto a polyethylene surface, the emulsion is less enriched with milk, as milk milk turns brown upon heating.

(D) DECALCOMANIA USE

Depending on whether the decalcomania is to be applied to a "non-plastic" surface or to a synthetic resin surface, the emulsion will be admixed with clear synthetic lacquer as specified under (A) hereinabove or, respectively, be admixed with a solvent as specified under (B) hereinabove.

In the following, there is given an example in which a synthetic lacquer is admixed to the emulsion.

Example V

Decalcomania pictures according to the invention are of the type comprising a luminous substance and bcome luminous after light exposure. The characteristic feature of the method according to the invention is that this luminous substance is emulsified in fresh milk prior to the application upon the base plate. The decalcomania picture prepared in this way may then, if desired, be protected by a coat consisting of a protective lacquer, namely, a transparent synthetic lacquer. A shiny or a dull lacquer may be utilized dependent on the purpose; in certain cases it has proved advantageous to mix fresh milk, as mentioned above, to the lacquer, namely in quantities up to appproximately 10%.

The production of decalcomania pictures according to the invention may for instance be carried out as follows:

The base plate is treated in a customary, well known way and may be coated with a film of cellulose finish, if desired, admixed coloring agents to obtain the desired flat color. An addition of a white alkyd resin paint may often be preferred.

The luminous color substance is then emulsified in fresh milk and applied to the base plate. An especially suitable method of applying the color substance is the well known silk print method. Upon this one may apply some text or other design, whereupon everything is coated by a film of synthetic, shiny or dull lacquer. Preferably there is also added milk to the lacquer.

The following data represent an example of the composition of the mass:

500–750 grams color substance ("Leuchtgelb Supra A")
25–150 grams fresh milk (not dairy processed)
150–400 grams shiny synthetic lacquer to which may be added up to approximately 10% fresh milk Decalcomania pictures of this kind are much used, especially for traffic signs, sign boards on board ships, or in meeting hall, et cetera. They have a long light period even after a short light exposure and are excellent for their purpose.

The decalcomania pictures may be used as transfer pictures, which is preferred for big types, or as slip transfers, which are especially suitable for small sized pictures. They may be transferred to common paper, wood, fiber plates, metals, fabric, glass or the like or material of synthetic resin.

I wish it to be understood that I do not desire to be limited to the exact details disclosed, for obvious modifications will occur to a person skilled in the art.

Having thus described the invention, what I claim as new and desire to be secured by Letters Patent is as follows:

1. In a method of preparing a luminous coating composition, the steps comprising mixing about 1000 parts by weight of a powdery substance composed of pigmented zinc sulfide and zinc cadmium sulfide with "R" parts by weight of fresh milk free from any dairy processing, stirring said mixture at room temperature for from 30 to 45 minutes until the powdery substance is emulsified in the milk and has a granular texture and dry appearance, the value "R" being from 80 to 120 when it is intended to apply the mixture subsequently to a polyethylene surface; the value "R" being from 350 to 450 when it is intended to mix the mixture subsequently with a clear nitrocellulose lacquer; and, respectively, the value "R" being from 350 to 450 when it is intended to mix the mixture subsequently with a solvent for a synthetic resin taken from the group consisting of vinyl resin, cellulose resin, and nylon.

2. In a method of producing a luminous coating composition to be used on a surface free from plastic, the steps comprising mixing at a temperature below the boiling point about 1000 parts by weight of a powdery substance composed of pigmented zinc sulfide and zinc cadmium sulfide with from 350 to 450 parts by weight of fresh milk free from any dairy processing, and mixing the last-named mixture with from about 600 to about 2000 parts by weight of a clear nitrocellulose lacquer.

3. In a method, as claimed in claim 2, said lacquer comprising up to 10 percent by weight of fresh milk free from any dairy processing.

4. In a method of producing a luminous coating composition to be applied by silk screening onto a base having a hard surface free from plastic, the steps comprising mixing at a temperature below the boiling point about 1000 parts by weight of a powdery substance composed of pigmented zinc sulfide and zinc cadmium sulfide with from 350 to 450 parts by weight of fresh milk free from any dairy processing, and mixing the last-named mixture with from 550 to 750 parts by weight of a clear nitrocellulose lacquer.

5. In a method of producing a luminous coating composition to be sprayed or respectively, rolled onto a surface free from plastic, the steps comprising mixing at a temperature below the boiling point about 1000 parts by weight of a powdery substance composed of pigmented zinc sulfide and zinc cadmium sulfide with from 350 to 450 parts by weight of fresh milk free from any dairy processing, and mixing the last-named mixture with about 1600 parts by weight of a clear nitrocellulose lacquer.

6. In a method of producing a luminous coating composition, to be used on a surface of material of synthetic resin taken from the group consisting of vinyl resin, cellulose resin, and nylon, the steps comprising mixing at a temperature below the boiling point about 1000 parts by weight of a powdery substance composed of pigmented zinc sulfide and zinc cadmium sulfide with from 350 to 450 parts by weight of fresh milk free from any dairy processing, and mixing said mixture with from 500 to 800 parts by weight of a solvent for said synthetic resin.

7. In a method of producing a luminous coated surface of material of synthetic resin taken from the group consisting of vinyl resin, cellulose resin, and nylon, the steps comprising mixing at a temperature below the boiling point about 1000 parts by weight of a powdery substance composed of pigmented zinc sulfide and zinc cadmium sulfide with from 350 to 450 parts by weight of fresh milk free from any dairy processing, mixing said mixture with from 500 to 800 parts by weight of a solvent for said synthetic resin, and applying the resultant composition to said surface.

8. In a method of producing a luminous coating composition to be used on a base having a surface of material of synthetic resin taken from the group consisting of vinyl resin, cellulose resin, and nylon, the steps comprising mixing at a temperature below the boiling point about 1000 parts by weight of a powdery substance composed of pigmented zinc sulfide and zinc cadmium sulfide with from 350 to 450 parts by weight of fresh milk free from any dairy processing, and mixing said mixture with from about 600 parts by weight of a solvent for said synthetic resin.

9. In a method of producing a luminous coating composition for a polyethylene surface prepared by flame heating with the flame cone touching said surface, the steps comprising, mixing at a temperature below the boiling point about 1000 parts by weight of a powdery substance composed of pigmented zinc sulfide and zinc cadmium sulfide with from 80 to 120 parts by weight of fresh milk free from any dairy processing, applying said mixture to said surface, and subsequently cooling the surface.

10. In a method of producing a luminous coating on a polyethylene surface prepared by flame heating with the flame cone touching said surface, the steps comprising, mixing at a temperature below the boiling point about 1000 parts by weight of a powdery substance composed of pigmented zinc sulfide and zinc cadmium sulfide with about 100 parts by weight of fresh milk, free from any dairy processing, applying said mixture to said surface, and subsequently cooling the same.

References Cited in the file of this patent

UNITED STATES PATENTS

| | | |
|---|---|---|
| 955,262 | Gousseff | Apr. 19, 1910 |
| 2,126,233 | Wakenhut | Aug. 9, 1938 |
| 2,154,362 | Scholz | Apr. 11, 1939 |
| 2,366,047 | Nerlinger | Dec. 26, 1944 |
| 2,558,803 | Wittgren | July 3, 1951 |
| 2,632,921 | Kreidl | Mar. 31, 1953 |
| 2,734,013 | Myers | Feb. 7, 1956 |

OTHER REFERENCES

"Preparation and Characteristics of Solid Luminescent Materials," symposium held at Cornell University, 1946, John Wiley and Sons, Inc., N.Y., 1948, pp. 182–204 relied on.